Patented Apr. 24, 1923.

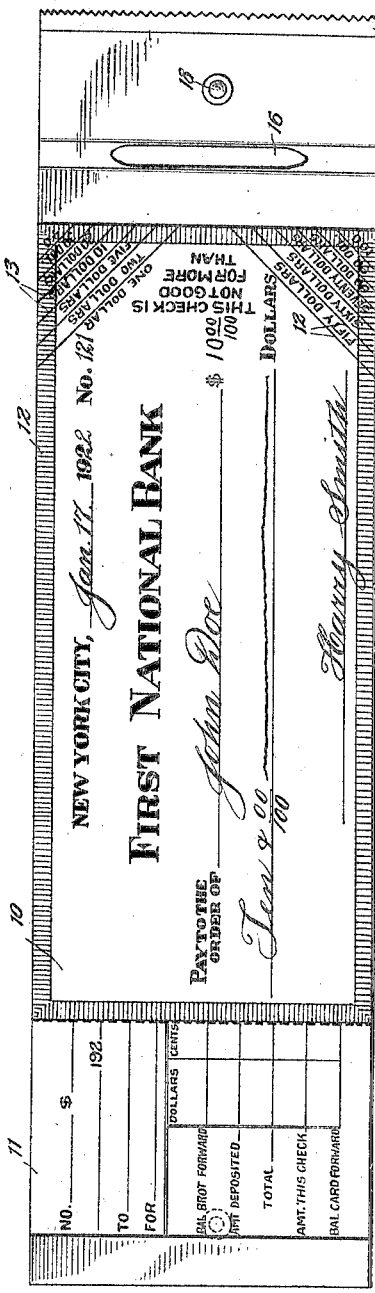

1,453,234

UNITED STATES PATENT OFFICE.

ROY BATES, OF NEVADA, MISSOURI.

BANK CHECK AND CHECK BOOK.

Application filed January 31, 1922. Serial No. 533,079.

*To all whom it may concern:*

Be it known that I, ROY BATES, a citizen of the United States, and a resident of Nevada, in the county of Vernon and State of Missouri, have invented a new and Improved Bank Check and Check Book, of which the following is a description.

An object of my invention is to provide a safety check of a character to prevent the check being raised materially beyond the amount for which the check is drawn.

A further object of the invention is to provide a check book having a cutting or severing attachment for detaching a corner or corners of a check embodying my invention.

The nature of the invention and its distinctive features and characteristics will clearly appear as the description proceeds.

Reference is to be had to the accompanying drawings forming part of this specification, it being understood that the drawings are merely illustrative of one example of the invention.

Figure 1 is a face view of a check embodying my invention and a cutter;

Figure 2 is an edge view of the check book embodying my invention;

Figure 3 is a fragmentary view of the check book illustrating the manner of using the cutter;

Figure 4 is a fragmentary view of the check indicating the manner of removing a portion, or portions, of the check for carrying out the safety feature.

In carrying out my invention in practice the body 10 of the check and the stub 11 may be of conventional form. Continuously around the body of the check or at least continuously at the outer end and along the sides is a border 12 of transverse lines or other distinctive character.

Obliquely at the outer corners of the check body I produce parallel rows of amounts representing given monetary values. On the check face there is printed or otherwise produced the notice "This check is not good for more than."

In the use of the check the designated monetary values at the corners are torn off except the one nearest to and above the amount for which the check is drawn. As for example the illustrated check is drawn for $10.00 and the check is severed to remove all the indicated monetary values at the corners except $10.00 and amounts below $10.00 so that the effect of the notice is that the check is not good for more than $10.00.

It will be observed that the indicated monetary values at the corners extend across the adjacent portions of the border 12 and therefore the check will have when the portions are severed in accordance with the amount for which the check is drawn oblique border lines at the right hand end. At all events the part of the border 12 at the end of the check will remain. If it should be attempted to remove the notice "This check is not good for more than" and the limiting amount printed obliquely in an attempt to raise the check, it will be necessary to sever the check laterally inward from the end border portion which will indicate to the bank that the check is not a proper one but has been wrongfully mutilated. Furthermore, it is to be observed that the available face of the check for receiving the features entering into the check for completeness of the latter, extends between the respective oblique series of monetary values for which reason any attempt to raise the check must involve the severing of the safety features for the removal of the oblique lines and monetary values as well as the words "This check is not good for more than" and it will be seen that the removal of the oblique lines will remove also the check number, the amount of the check as expressed in numerals and the word "dollars" so that the check will then be incomplete and a mere fragment and not redeemable.

To prevent the restoring of corners on the check by parties attempting to raise the check, I provide for severing the oblique lines on an irregular line to leave a serrated edge for which purpose the check book A has a cutting device in the form of an extension designated by the numeral 14. Said extension has a weakened or foldable zone 15 in which is an elongated opening 16 for permitting a corner of the check to be passed through the severing device at said zone 15. The outer transverse edge of the severing device 14 is provided with a cutter 17 in the form of a clip or strip of metal having saw teeth to form a cutter. The check having been torn from the stub, the cutter device is folded at the approximate medial line of the zone 15 and the corner of the check passed through the opening 16.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A check book having an extension at the outer end constituting a cutting device, said cutting device being foldable on itself and having an opening therethrough at the folding zone for the passage through the opening of a corner of a check, the edge of said extension having a cutter.

2. As a new article of manufacture, a check book having a cutter foldable on itself and formed with an opening for the passage therethrough of a corner of a check, the end edge of the said extension being provided with a cutter, said cutter having a serrated cutting edge.

ROY BATES.